UNITED STATES PATENT OFFICE.

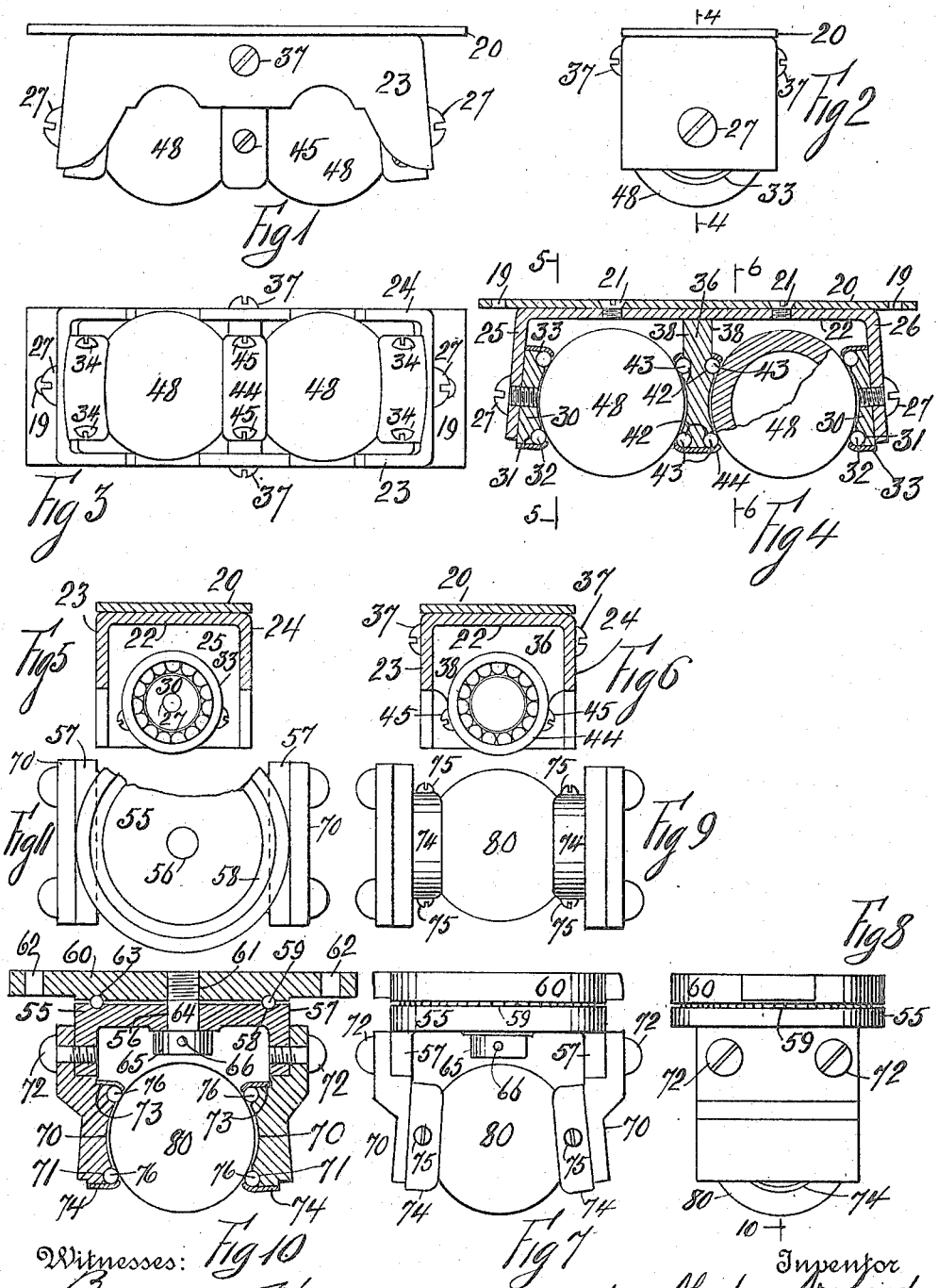

ABRAHAM ARMBAND, OF NEW YORK, N. Y., ASSIGNOR TO MAURICE L. FARBER, OF NEW YORK, N. Y.

ROLLER-BEARING CASTER.

1,271,113.      Specification of Letters Patent.      Patented July 2, 1918.

Original application filed August 9, 1907, Serial No. 387,853. Divided and this application filed August 26, 1913, Serial No. 786,676. Renewed November 26, 1917. Serial No. 204,102.

*To all whom it may concern:*

Be it known that I, ABRAHAM ARMBAND, a citizen of the United States, and a resident of the borough of Manhattan, in the county of New York and State of New York, have invented certain new and useful Improvements in Roller-Bearing Casters, of which the following is a specification.

This invention relates to a roller bearing caster and is a divisional application of my patent application for ball roller skates, filed August 9, 1907, Serial Number 387,853.

It can be applied to a skate, various articles of furniture, and to many other objects, where it is desirable to roll the object supported in various straight or curved directions.

Referring to the drawings, Figure 1 represents a front elevation of a double roller bearing caster, Fig. 2 is a right hand side view of Fig. 1, Fig. 3 shows a bottom plan view of Fig. 1, Fig. 4 represents a section of Fig. 2 on the line 4, 4, Fig. 5 is a partial section as on the line 5, 5 of Fig. 4, Fig. 6 shows a section as on the line 6, 6 of Fig. 4, Fig. 7 represents a front view of a modification of the invention, Fig. 8 is a right hand view of Fig. 7, Fig. 9 is a partial top view of Fig. 7, Fig. 10 shows a section of Fig. 8 on the line 10, 10, and Fig. 11 shows a partial top view of Fig. 10.

Referring to Figs. 1 to 6, the double roller bearing caster is represented with the roof plate 20, having openings 19 to which is secured a cage by means of the screws 21. The cage is represented with the top wall 22, side walls 23, 24 and the end walls 25, 26 which latter incline or flare out from their upper to their lower ends. To each of the end walls, 25 and 26 is fastened by means of a screw 27, a concaved side roller bearing seat 30, having an annular bearing groove 31, for the ball bearings 32. The ball bearing seat 30 is preferably made cylindrical on its outer surface and supports the ring cover 33, which latter is fastened in place by means of the screws 34. The office of the ring cover 33 is to maintain the ball bearings 32 in place. At the central portion of the cage is located the central concaved side ball bearing seat 36, which is fastened to the walls 23, 24 of the cage by means of the screws 37. The latter seat has sides 38 which are perpendicular to the top wall 22 of the said cage, although they may incline, as described for the seats secured to the ends walls 25, 26. The seat 36 has formed therein the annular bearing grooves 42 for the ball bearings 43. A double ring cover 44 is fastened to the central concaved side ball bearing seat 36 by means of the screws 45. Between the ball bearings 32 and 43 are supported the ball rollers 48, which are preferably made hollow as indicated. The ball rollers by reason of the ball bearings located in the lower portions of the annular grooves 31 and 42, are prevented from becoming disengaged from their seats. The inclinations of their seats with the ball bearings, prevents them being pushed upwardly, when excessive pressure is brought to bear against them.

In the modification of the invention represented in Figs. 7 to 11 a single roller bearing caster is shown. It comprises a cage with the top member 55 having the central opening 56, the depending end legs 57, and the annular groove 58 in the crown thereof for the ball bearings 59. A roof plate 60 having the central threaded opening 61, openings 62 and the annular groove 63 for the ball bearings 59 is located over the top member 55. A king bolt 64 is fastened in the threaded opening 61 and extends through the opening 56. A collar 65 on the bolt 63 is held in place by the pin 66.

Inclined and concaved side roller bearing seats 70 having the annular bearing grooves 71 are fastened to the legs 59 by means of the screws 72. A cylindrical wall 73 is preferably formed with each of the seats 70 and supports a ring cover 74, which latter is held in place by means of the screws 75. Roller bearings 76 are located in the grooves 71 and are held in place by the ring covers 74. Between the roller bearings 76 of the pair of roller bearing seats 70 are supported the ball rollers 80.

In this modification of the invention it will be noted that the roller bearings 59 coact with the roller bearings 76, to enable the ball roller 80 to turn in various directions.

The double roller bearing caster is fastened in place to an object with which it is to be used by screws and the like extending through the openings 19 of the roof plate 20 thereof. The openings 62 of the roof plate 60 of the single roller caster are used for a similar purpose.

The preferable disposition of the ball rollers and the seats for the roller bearings is such that the horizontal axis passing through the ball rollers will pass through the centers of the seats.

Having described my invention what I desire to secure by Letters Patent and claim is:

1. In a roller bearing caster the combination of a cage having end walls, roller bearing seats for said end walls having annular bearing grooves, ball bearings in said grooves, ring covers over the ends of the ball bearings and a ball roller maintained in proper position by said ball bearings.

2. In a roller bearing caster the combination of a cage having inclined end walls, roller bearing seats detachably fastened to said end walls and having annular bearing grooves, ball bearings in said grooves, ring covers over the ends of the ball bearing seats, a central ball bearing seat detachably connected to the cage and between the ball bearing seats attached to said end walls and having annular grooves, ball bearings in the latter grooves, a ring cover over the central ball bearing seats and ball rollers between the ball bearings of the central bearing seat and the ball bearings of the other ball bearing seats.

Signed at the borough of Manhattan in the county of New York and State of New York this 20th day of August A. D. 1913.

ABRAHAM ARMBAND.

Witnesses:
A. DE BONNEVILLE,
HARRIET HILLMAN.

Copies of this patent may be obtained for five cents each, by addressing the "Commissioner of Patents, Washington, D. C."